(12) United States Patent
Han et al.

(10) Patent No.: US 12,489,201 B2
(45) Date of Patent: Dec. 2, 2025

(54) LIQUID CRYSTAL ANTENNA, SPLICING LIQUID CRYSTAL ANTENNA AND METHOD OF FORMING LIQUID CRYSTAL ANTENNA

(71) Applicant: Chengdu Tianma Micro-Electronics Co., Ltd., Chengdu (CN)

(72) Inventors: Xiaonan Han, Chengdu (CN); Baiquan Lin, Chengdu (CN); Linzhi Wang, Chengdu (CN); Zhen Liu, Chengdu (CN); Yifan Xing, Chengdu (CN); Yiran Zhu, Chengdu (CN); Zuocai Yang, Chengdu (CN); Yingru Hu, Chengdu (CN)

(73) Assignee: Chengdu Tianma Micro-Electronics Co., Ltd., Chengdu (CN)

( * ) Notice: Subject to any disclaimer, the term of this patent is extended or adjusted under 35 U.S.C. 154(b) by 242 days.

(21) Appl. No.: 18/224,249

(22) Filed: Jul. 20, 2023

(65) Prior Publication Data
US 2024/0222855 A1    Jul. 4, 2024

(30) Foreign Application Priority Data
Dec. 30, 2022  (CN) .......................... 202211740362.5

(51) Int. Cl.
*H01Q 1/36*    (2006.01)
*H01Q 1/12*    (2006.01)

(52) U.S. Cl.
CPC ................. *H01Q 1/36* (2013.01); *H01Q 1/12* (2013.01)

(58) Field of Classification Search
CPC .. H01Q 1/02; H01Q 1/12; H01Q 1/36; H01Q 3/44; H01Q 21/00; H01Q 21/06; H01Q 21/0655; H01Q 21/0025; G02F 1/13; G02F 1/133; G02F 1/1339
See application file for complete search history.

(56) References Cited

U.S. PATENT DOCUMENTS

| | | | |
|---|---|---|---|
| 11,469,500 B2 * | 10/2022 | Yang .................... | G02F 1/13439 |
| 2012/0212375 A1 * | 8/2012 | Depree, IV ........ | H01Q 15/0086 977/762 |
| 2018/0205156 A1 * | 7/2018 | Li ...................... | G02F 1/133382 |
| 2022/0094056 A1 * | 3/2022 | Yang .................... | H01Q 9/0457 |

FOREIGN PATENT DOCUMENTS

| | | |
|---|---|---|
| CN | 109633994 A | 4/2019 |
| CN | 109752889 A | 5/2019 |

* cited by examiner

*Primary Examiner* — Thai Pham
(74) *Attorney, Agent, or Firm* — Anova Law Group, PLLC (57) ABSTRACT

Liquid crystal antenna, splicing liquid crystal antenna, and method of forming liquid crystal antenna are provided. The liquid crystal antenna includes support structures, liquid crystals, a first substrate and a second substrate. The first substrate and the second substrate are arranged oppositely, the support structures are arranged between the first substrate and the second substrate, the first substrate includes first metal layers arranged on a side of the first substrate facing the second substrate, the second substrate includes a second metal layer arranged on a side of the second substrate facing the first substrate. The second metal layer includes functional part and spacers, the functional parts and the first metal layers are stacked along a first direction perpendicular to the second substrate, and the functional parts at least partially overlap the first metal layers. The support structures are arranged between the spacers and the first metal layers.

23 Claims, 8 Drawing Sheets

LIQUID CRYSTAL ANTENNA, SPLICING LIQUID CRYSTAL ANTENNA AND METHOD OF FORMING LIQUID CRYSTAL ANTENNA

CROSS-REFERENCE TO RELATED APPLICATION

This application claims priority of Chinese Patent Application No. 202211740362.5, filed on Dec. 30, 2022, the entire contents of which are hereby incorporated by reference.

FIELD OF THE DISCLOSURE

The present disclosure generally relates to the field of antenna technology and, more particularly, relates to a liquid crystal antenna, a splicing liquid crystal antenna, and a method of forming a liquid crystal antenna.

BACKGROUND

In an existing liquid crystal antenna product, a liquid crystal box is arranged, and a dielectric constant is changed by controlling a state of liquid crystal molecules in the liquid crystal box to play a phase shifting role. If a thickness of the liquid crystal box is uneven, a performance of the liquid crystal antenna product may be greatly affected. In a current liquid crystal antenna product, a thickness of each part of the liquid crystal box is usually achieved by mixing support particles with a specific particle size into a frame glue between an upper substrate and a lower substrate, which is difficult to ensure a uniform thickness of each part.

Especially in some products, copper is applied to form phase shifter wires and connection wires. Considering limitations of commonly used physical vapor deposition (PVD) devices and processes, when a large-area metal film is formed, differences in metal thickness at different positions are greater, a metal film layer is much thicker than a conventional film layer, and a uniformity of each position is not good, resulting in a greater difference in an absolute value of a film thickness. Since thicknesses of the copper film at different positions on the glass substrates vary greatly from a perspective of an independent performance of each antenna, it is required to control a box thickness between the upper substrate and the lower substrate. For a same batch of products, it is even more necessary to keep a performance of each independent antenna consistent. If a conventional design is adopted, i.e., a support is arranged between copper and glass, even if the support has a same specification, it can only make a distance between one layer of copper and the glass substrates same, a distance between the copper on two sides of the upper and lower substrates may still be affected by a thickness of the one layer of copper. Especially in different independent antennas, thicknesses of copper at a same position may vary greatly, resulting in a large difference in a box thickness between antennas even in a same batch of products, which is not conducive to antenna design and use.

BRIEF SUMMARY OF THE DISCLOSURE

One aspect of the present disclosure provides a liquid crystal antenna. The liquid crystal antenna includes support structures, liquid crystals, a first substrate and a second substrate. The first substrate and the second substrate are arranged oppositely, the support structures are arranged between the first substrate and the second substrate, the first substrate includes first metal layers arranged on a side of the first substrate facing the second substrate, the second substrate includes a second metal layer arranged on a side of the second substrate facing the first substrate. The second metal layer includes functional part and spacers, the functional parts and the first metal layers are stacked along a first direction perpendicular to the second substrate, and the functional parts at least partially overlap the first metal layers. The support structures are arranged between the spacers and the first metal layers.

Another aspect of the present disclosure provides a splicing liquid crystal antenna including liquid crystal antennas. A liquid crystal antenna of the liquid crystal antennas includes support structures, liquid crystals, a first substrate and a second substrate. The first substrate and the second substrate are arranged oppositely, the support structures are arranged between the first substrate and the second substrate, the first substrate includes first metal layers arranged on a side of the first substrate facing the second substrate, the second substrate includes a second metal layer arranged on a side of the second substrate facing the first substrate. The second metal layer includes functional part and spacers, the functional parts and the first metal layers are stacked along a first direction perpendicular to the second substrate, and the functional parts at least partially overlap the first metal layers. The support structures are arranged between the spacers and the first metal layers. The functional parts in the liquid crystal antenna are arranged along a fourth direction and a fifth direction, and the fourth direction and the fifth direction are orthogonal. a distance between the functional parts in a same liquid crystal antenna along the fourth direction is A1, A distance along the fourth direction between adjacent functional parts of the adjacent liquid crystal antennas along the fourth direction is B1, and $1.2*B1 \geq A1 \geq 0.8*B1$. a distance between the functional parts in a same liquid crystal antenna along the fifth direction is A2, a distance along the fourth direction between adjacent functional parts of the adjacent liquid crystal antennas along the fifth direction is B2, and $1.2*B2 \geq A2 \geq 0.8*B2$.

Another aspect of the present disclosure provides a method of forming a liquid crystal antenna. The liquid crystal antenna includes support structures, liquid crystals, a first substrate and a second substrate. The first substrate and the second substrate are arranged oppositely, the support structures are arranged between the first substrate and the second substrate, the first substrate includes first metal layers arranged on a side of the first substrate facing the second substrate, the second substrate includes a second metal layer arranged on a side of the second substrate facing the first substrate. The second metal layer includes functional part and spacers, the functional parts and the first metal layers are stacked along a first direction perpendicular to the second substrate, and the functional parts at least partially overlap the first metal layers. The support structures are arranged between the spacers and the first metal layers. The method includes providing a first base and forming first metal layers on the first base to obtain a first substrate; providing a second base and forming a second metal layer on the second base to obtain a second substrate; forming at least two support structures on the second substrate, the support structures being arranged around part of the second metal layer respectively; injecting liquid crystals into a space formed by the support structures; aligning and pressing the first substrate and the second substrate, the first metal layer facing the second substrate, and the second metal layer facing the first substrate to form a large antenna; and cutting the large antenna to form at least two liquid crystal antennas.

Other aspects of the present disclosure can be understood by a person skilled in the art in light of the description, the claims, and the drawings of the present disclosure.

BRIEF DESCRIPTION OF THE DRAWINGS

To illustrate embodiments of the present disclosure more clearly, accompanying drawings which need to be used in the embodiments or the art are simply introduced below. Obviously, the accompanying drawings described below are merely some embodiments of the present disclosure, and a person skilled in the art can also obtain other drawings according to the structures shown in the accompanying drawings and described herein without creative efforts.

Reference Signs List: 10—liquid crystal antenna; 100—first substrate; 110—first metal layer; 111—opening; 120—radiation electrode; 130—conductive hole; 20—large antenna; 200—second substrate; 210—second metal layer; 211—spacer; 2111—padding portion; 2112—first interval; 2113—first padding sub-portion; 2114—second interval; 2115—second padding sub-portion; 2116—light-transmitting portion; 212—functional part; 220—signal control component; 230—signal transmission component; 240—step area; 250—first side; 260—second side; 270—third side; 280—fourth side; 300—liquid crystal; 400—support structure; 410—frame glue; 420—conductive member; 430—silicon ball; 500—feeder line; 600—transfer port; and 202—splicing liquid crystal antenna.

DETAILED DESCRIPTION

To make objectives, technical solutions, and advantages of the embodiments of the present disclosure clearer, the following clearly and completely describes the technical solutions in the embodiments of the present disclosure with reference to the accompanying drawings in the embodiments of the present disclosure. Obviously, the described embodiments are some but not all of the embodiments of the present disclosure. All other embodiments obtained by a person skilled in the art based on the embodiments of the present disclosure without creative efforts fall within the protection scope of the present disclosure.

The terminology used in the embodiments of the present disclosure is merely illustrative and is not intended to limit the present disclosure. As used in the embodiments of the present disclosure and the appended claims, the singular forms "a", "said" and "the" are also intended to include plural forms unless the context clearly indicates otherwise.

Figure 1:
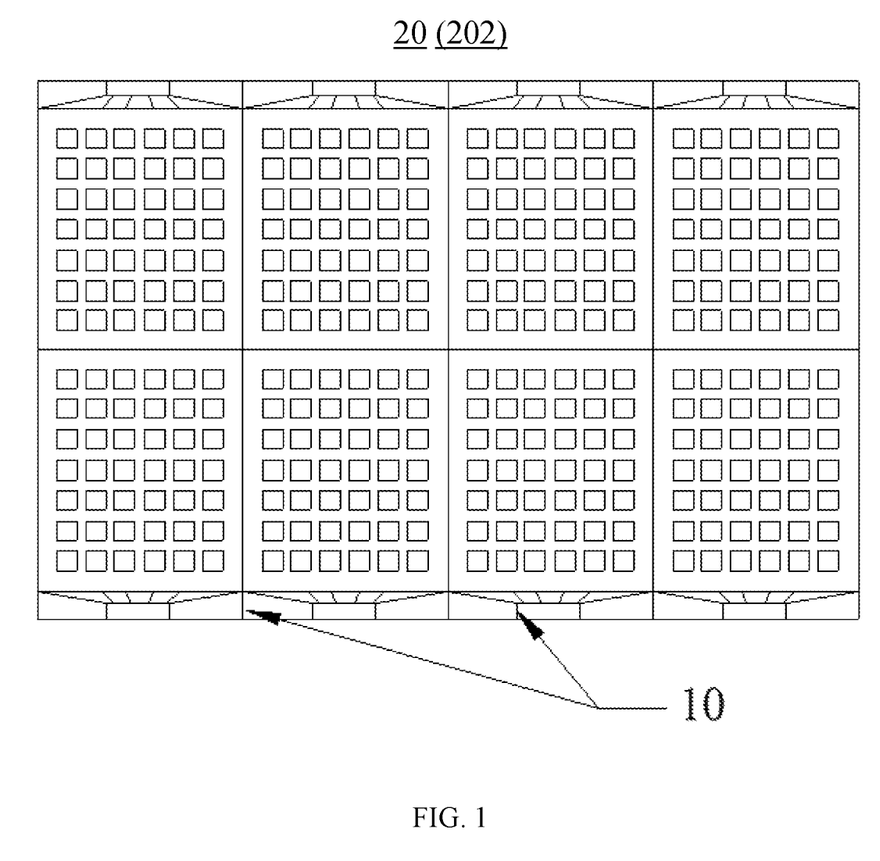
FIG. 1 illustrates a schematic diagram of a large antenna provided by an embodiment of the present disclosure.

FIG. 1 illustrates a schematic structural diagram of a large antenna 20 provided by an embodiment of the present disclosure. The large antenna 20 includes a plurality of liquid crystal antennas 10, which are divided into a plurality of independent liquid crystal antennas 10 by forming the large antenna 20 and cutting the large antenna 20 into the plurality of independent liquid crystal antennas 10 for independent use or splicing use.

Figure 2:
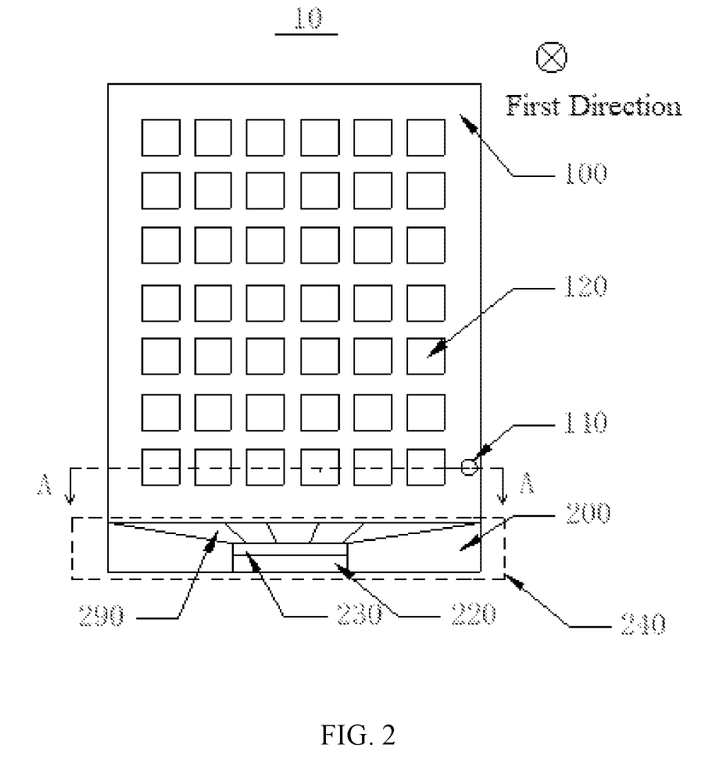
FIG. 2 illustrates a schematic diagram of a crystal antenna provided by an embodiment of the present disclosure.
Figure 3:
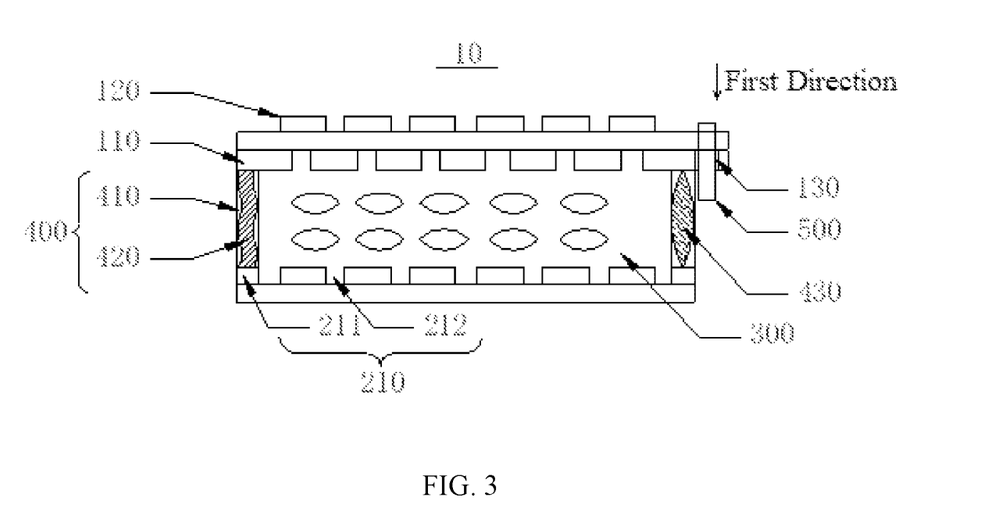
FIG. 3 illustrates an A-A cross-sectional view of the antenna in FIG. 2.

FIG. 2 illustrates a schematic diagram of a liquid crystal antenna 10 provided by an embodiment of the present invention. FIG. 3 illustrates an A-A cross-sectional view of the liquid crystal antenna 10 in FIG. 2. The liquid crystal antenna 10 includes support structures 400, liquid crystals 300, a first substrate 100 and a second substrate 200. The first substrate 100 and the second substrate 200 are arranged oppositely, and the liquid crystals 300 are arranged between the first substrate 100 and the second substrate 200. The support structures 400 are arranged between the first substrate 100 and the second substrate 200, and a distance between the first substrate 100 and the second substrate 200 is maintained by the support structures 400.

The first substrate 100 includes first metal layers 110 arranged on a side of the first substrate 100 facing the second substrate 200. The second substrate 200 includes a second metal layer 210 arranged on a side of the second substrate 200 facing the first substrate 100. The second metal layer 210 includes functional parts 212 and spacers 211, the functional parts 212 and the first metal layers 110 are stacked along a first direction perpendicular to the second substrate 200. The functional parts 212 at least partially overlap the first metal layers 110, and the support structures 400 are arranged between the spacers 211 and the first metal layers 110. Since the spacers 211 and the functional parts 212 are made through a same metal layer, thicknesses of adjacent spacer 211 and functional part 212 are close. Therefore, a distance between the spacers 211 and the first metal layers 110 is close to a distance between the functional parts 212 and the first metal layers 110, thereby maintaining the distance between the functional parts 212 and the first metal layers 110.

It should be noted that, in the present embodiment, the first substrate 100 further includes radiation electrodes 120 arranged on a side of the first substrate 100 away from the second substrate 200. Openings 111 are arranged on the first metal layers 110 and positions of the openings 111 coincide with the radiation electrodes 120, to prevent the first metal layers 110 from completely blocking transmissions of signals between the functional parts 212 and the radiation electrodes 120 through the openings 111.

Optionally, in one embodiment, the liquid crystal antenna 10 further includes feeder lines connected to the functional parts 212 and provides radio frequency signals to the radiation electrodes 120 through coupling between the functional parts 212 and the radiation electrodes 120.

In the embodiment, the first metal layer 110 and the first substrate 100 are arranged with a conductive hole 130. The feeder lines pass through the conductive hole 130, cores of the feeder lines are connected to a power dividing network, and outer rings of the feeder lines are connected to the first metal layers 110, thereby saving a space occupied by the liquid crystal antenna 10 on a plane of the first substrate 100.

Figure 4:
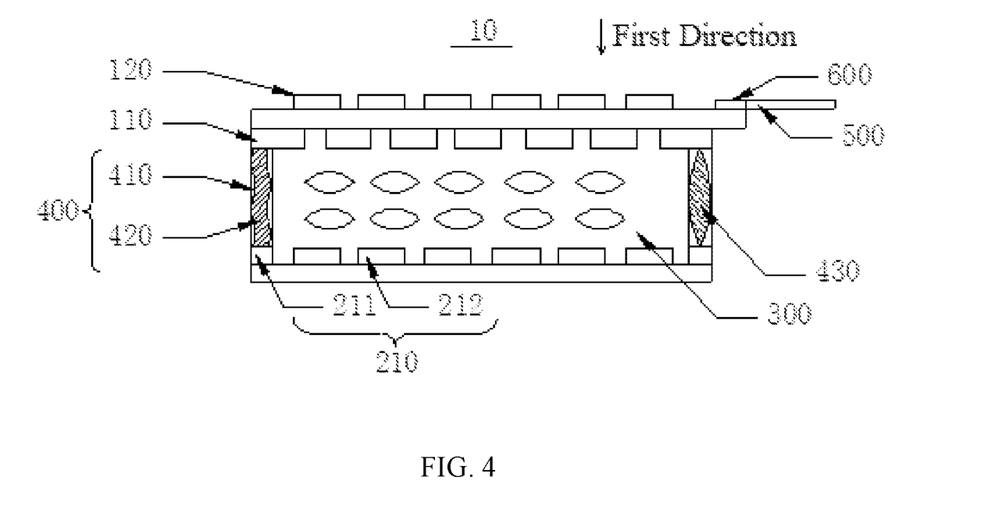
FIG. 4 illustrates a cross-sectional view of a crystal antenna provided by another embodiment of the present disclosure.

FIG. 4 illustrates a cross-sectional view of the crystal antenna 10 provided by another embodiment of the present disclosure. In one embodiment, the feeder lines can be directly plugged or welded or transferred to the radiation electrodes 120 through a transfer port 600, so that there is no need to open holes on the first metal layers 110 and the first substrate 100, which simplifies a process and save a cost.

Figure 5:
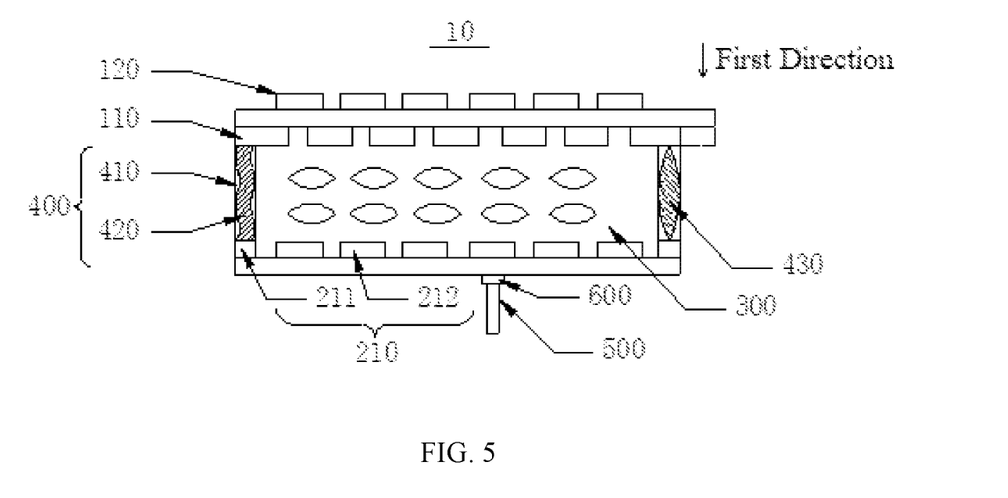
FIG. 5 illustrates a cross-sectional view of a crystal antenna provided by another embodiment of the present disclosure.

FIG. 5 illustrates a cross-sectional view of the crystal antenna 10 provided by another embodiment of the present disclosure. In one embodiment, the transfer port 600 can be arranged on a side of the second substrate 200 away from the first substrate 100, and waveguide feeder lines can be selected to connect to the transfer port 600, so that the signals can be transmitted to the radiation electrodes 120 after feeding the signals to the functional parts 212, which simplifies a formation of the first substrate 100.

Referring to FIG. 2 and FIG. 3, optionally, in one embodiment, the first metal layers 110 are ground electrodes, the functional parts 212 are phase shifters, the second substrate 200 is arranged with a signal control component 220 and a signal transmission component 230. The signal control component 220 is electrically connected to the functional parts 212 and the ground electrode through the signal transmission component 230. The signal control component 220 provides phase-shift control signals for the functional parts 212. The signal control component 220 changes radiation signals of the radiation electrodes 120, and further changes a working state of the liquid crystal antenna 10 by providing bias voltages for the functional parts 212, controlling a rotation direction of the liquid crystals 300 and changing a dielectric constant of the liquid crystals 300.

In one embodiment, the signal control component 220 is a chip, and the signal transmission component 230 includes a bonding pad and signal lines. The chip is connected to the signal lines through the bonding pad and fixed on the second substrate 200, so that the phase shift control signals are transmitted to the functional parts 212 on the second substrate 200 through the signal lines.

It can be understood that, in other optional embodiments, the signal control component 220 may also include a flexible circuit board, to adjust a specific signal input mode according to actual needs of the liquid crystal antenna 10, such as usage scenarios, assembly requirements, and costs, which is not specially limited herein.

Optionally, in one embodiment, the support structure 400 includes a conductive member 420, one end of the conductive member 420 is connected to a signal line, and the other end is connected to a ground electrode, to provide a required signal for the ground electrode.

In the embodiment, the support structure 400 includes a frame glue 410, and the conductive member 420 is a gold ball or a silver paste, to better integrate the conductive member 420 into the support structure 400 and ensure a better electrical conduction effect.

Optionally, in one embodiment, the support structure 400 includes a silicon ball 430 arranged in the frame glue 410, and the first substrate 100 and the second substrate 200 are supported by the silicon balls 430 having a certain size.

Figure 6:
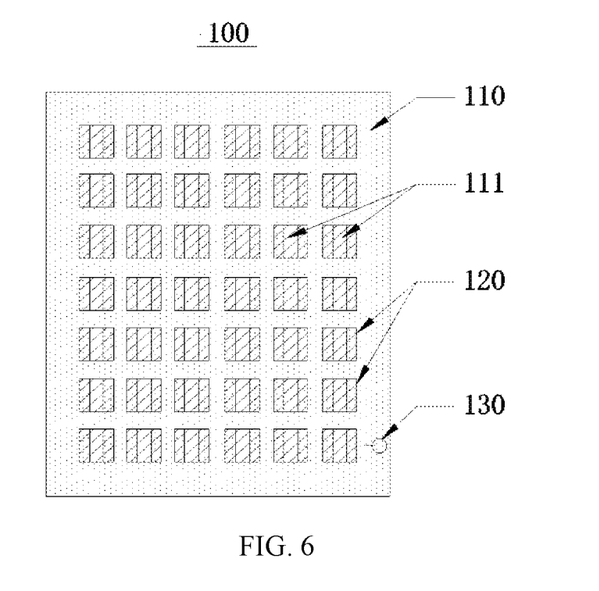
FIG. 6 illustrates a schematic diagram of a first substrate provided by an embodiment of the present disclosure.
Figure 7:
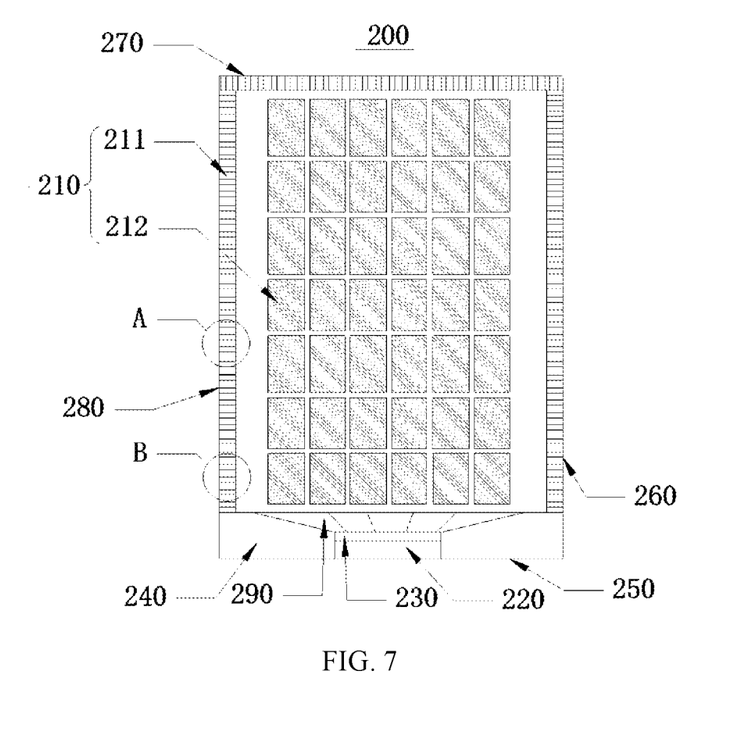
FIG. 7 illustrates a schematic diagram of a second substrate provided by an embodiment of the present disclosure.

FIG. 6 illustrates a schematic diagram of the first substrate 100 provided by an embodiment of the present disclosure. FIG. 7 illustrates a schematic diagram of the second substrate 200 provided by an embodiment of the present disclosure. Referring to FIG. 3, FIG. 6 and FIG. 7, ground electrodes are arranged on an entire surface of the first substrate 100, the functional parts 212 are arranged in a central area of the second substrate 200, spacers 211 are arranged in a peripheral area of the second substrate 200 around the central area. The spacers 211 partially overlap positions where the ground electrodes are arranged, and the support structures 400 are arranged between the ground electrodes and the spacers 211 to maintain a distance between the first substrate 100 and the second substrate 200.

It should be noted that, since thicknesses of the metal layers fluctuate greatly, if the spacers 211 are not arranged, in different liquid crystal antennas 10 of a same large antenna 20, the support structures 400 can only maintain a distance between the first metal layers 110 and a glass base of the second substrate 200, while a distance between the functional parts 212 and the first metal layers 110 cannot exclude an influence of thicknesses of the functional parts 212 on the second substrate 200. Based on a characteristics of a metal film forming process, the larger an area of a metal layer, the greater a difference in film thickness at different positions, and the smaller an area of the metal layer, the smaller a difference in film thickness at different positions. A plurality of liquid crystal antennas 10 can be integrated on a large antenna 20, and a thickness of the second metal layer 210 used by different liquid crystal antennas 10 may vary greatly, resulting in large differences in a box thickness of each liquid crystal antenna 10. A distance between the functional parts 212 and the ground electrodes of different liquid crystal antennas 10 is not only affected by a size of the silicon ball 430 but also affected by thicknesses of the functional parts 212. Since the spacers 211 are arranged in the embodiment, and in a same liquid crystal antenna 10, positions of the spacers 211 are close to positions of the functional parts 212, and differences in thickness are small, a distance between the spacers 211 and the first metal layers 110 maintained by the silicon ball 430 is substantially equal to a distance between the functional parts 212 and the first metal layers 110. Even if an actual thickness of the second metal layer 210 in different liquid crystal antennas 10 is inconsistent, as long as a specification of the silicon ball 430 is consistent, a distance between the functional parts 212 and the first metal layers 110 is equal to the specification of the silicon ball 430, so that a performances of different liquid crystal antennas 10 are consistent.

Optionally, in one embodiment, a thickness of the spacer 211 along the first direction is H1, a thickness of the functional part 212 along the first direction is H2, and H1 is equal to H2. By making thicknesses of the spacers 211 and the functional parts 212 in a same liquid crystal antenna 10 consistent, a distance between the spacers 211 and the ground electrodes and a distance between the functional parts 212 and the ground electrodes are consistent, thereby further improving an antenna performance.

It can be understood that, in other optional embodiments, 1.2*H2 is equal to H1, and thicknesses of the spacers 211 are different form thicknesses of the functional parts 212 in some areas, but the thicknesses of the spacers 211 and the thicknesses of the functional parts 212 are generally close to each other.

It can also be understood that, in other optional embodiments, 0.8*H2 is equal to H1, and the thicknesses of the spacers 211 are different form thicknesses of the functional parts 212 in some areas, but the thicknesses of the spacers 211 and the thicknesses of the functional parts 212 are generally close to each other.

Optionally, in one embodiment, part of the functional parts 212 overlaps ground electrodes. A distance from the ground electrodes to the functional parts 212 along the first direction is D1, a thickness from the ground electrodes to the spacers along the first direction is D2, and D1 is equal to D2, so that a distance between the spacers 211 and a ground electrodes and a distance between the functional parts 212 and a ground electrodes are consistent.

It can be understood that, in other optional embodiments, D1 is equal to 1.2*.

It can also be understood that, in other optional embodiments, D1 is equal to 0.8*D2.

Optionally, in one embodiment, the second substrate 200 includes a stepped area 240, the signal control component 220 and the spacers are arranged on the stepped area 240. A projection of the first substrate 100 on the second substrate 200 along the first direction covers an area of the second substrate 200 except the step area 240, to facilitate an installation of the signal control component 220.

It should be noted that, in the embodiment, the second substrate 200 includes a first side 250, a second side 260, a third side 270 and a fourth side 280 connected in sequence. The step area 240 is arranged on the first side 250, and the spacers 211 are arranged on the second side 260, the third side 270 and the fourth side 280, thereby providing a sufficient space for installing the signal control component 220 and the signal transmission component 230 and supporting the first substrate 100 and the second substrate 200 from at least three directions at a same time.

It can be understood that, in other optional embodiments, the spacers 211 can also be arranged on the second side 260, the third side 270, the fourth side 280, part of the first side 250 adjacent to the second side 260 area and part of the first side 250 adjacent to the fourth side 280, to provide support for the first substrate 100 and the second substrate 200 in more directions.

It should be noted that, in the embodiment, the second substrate 200 includes a fan-out area 290 arranged on the first side 250 of the second substrate 200. The second metal layer 200 includes a plurality of fan-out lines arranged in the fan-out area 290. Two ends of the fan-out line are respectively connected to the functional part 212 and the signal transmission component 230. The signal transmission component 230 is connected to the functional parts 212 on the second metal layer 200 through fan-out lines and is located adjacent to the signal transmission component 230 to simplify a routing.

Optionally, in one embodiment, a thickness of the fan-out line along the first direction is H3, a thickness of the spacer along the first direction is H1, and H3 is equal to H1. Since the fan-out lines are formed through the second metal layer 210 and are arranged on a side of the second substrate 200, if the spacers 211 are only arranged on the second side 260, the third side 270, and the fourth side 280 respectively, the first side 250 may lack corresponding support. Therefore, fan-out lines are arranged on the first side 250, which is also formed through the second metal layer 210 and has a same thickness as the functional parts 212, thereby avoiding an uneven thickness of each edges of a same liquid crystal antenna 10 and improving a support effect.

It can be understood that, in other optional embodiments, H1 can also be equal to 1.2*H3, to avoid a local thickness of the first side 250 being too high to cause an uneven whole thickness of the liquid crystal antenna 10 and improve a support uniformity on the second side 260, the third side 270 and the fourth side 280. The first side 250 is only configured to avoid a too low thickness on the first side 250.

It can be understood that, in other optional embodiments, H1 may also be equal to 0.8*H3, to improve a local support effect on the first side 250.

Figure 8:
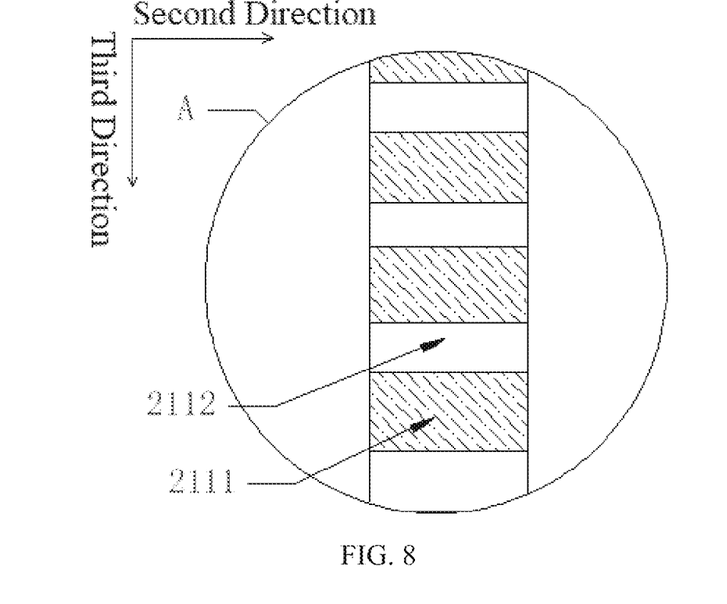
FIG. 8 illustrates a partial enlarged view of an area A in in FIG. 7.

FIG. 8 illustrates a partial enlarged view of an area A in FIG. 7.

Optionally, in one embodiment, the spacers 211 and the functional parts 212 are disconnected. The functional parts 212 are configured to receive phase-shift control signals and control a state of the liquid crystals 300, but not to receive electrical signals. Therefore, disconnecting the spacers 211 from the functional parts 212 prevents the spacers 211 from affecting electrical properties of the functional part 212.

In the embodiment, the spacer 211 includes a plurality of padding portions 2111 arranged adjacent to at least one edge of the second substrate 200. A second direction is a direction pointing from an edge to a central area. At least one first interval 2112 is between a plurality of projections of the plurality of padding portions 2111 formed towards an edge along the second direction. If the spacers 211 are a metal ring surrounding the functional parts 212, a signal transmission of the liquid crystal antenna 10 may be hindered and a performance of the liquid crystal antenna 10 may be affected. Therefore, in the embodiment, the at least one first interval 2112 is arranged to facilitate a signal transmission of the liquid crystal antenna 10.

Referring to FIG. 3, FIG. 6 and FIG. 7, optionally, in one embodiment, for the adjacent padding portions 2111 arranged along a same edge, a plurality of projections formed towards an edge along the second direction are spaced apart from each other. An emission of a signal from the liquid crystal antenna 10 is further facilitated by providing an interval between each of the padding portions 2111. Since the frame glue 410 used in the support structure 400 needs to be irradiated with ultraviolet light to realize a curing of the frame glue 410 and play a role of support and fixation. The frame glue 410 is arranged corresponding to the padding portions 2111, so an interval is arranged between each padding portion 2111 to facilitate a light to pass through, and the frame glue 410 has a better curing effect.

In the embodiment, the first interval 2112 is rectangular, and a length of the first interval 2112 along the second direction is greater than a length of the first interval 2112 along a third direction perpendicular to the second direction. By setting the first interval 2112 as a rectangle and perpendicular to an edge, a signal is easy to be transmitted out of the edge through the first interval 2112, which improves a signal transmission effect, and meets requirements of irradiation of ultraviolet light on the frame glue 410 at a same time.

It can be understood that, in other optional embodiments, the first intervals 2112 can also extend along the third direction, to narrow a width of the frame and achieve an effect of a narrow frame.

Optionally, in the embodiment, a projected area of the padding portion 2111 on the second substrate 200 along the first direction is S1, and a projected area of the frame glue 410 on the second substrate 200 along the first direction is S2, and S1 is equal to 0.6*S2. Since areas occupied by the padding portions 2111 in the frame glue 410 are too small, the support structures 400 cannot be accurately placed between the padding portions 2111 and the ground electrodes, while areas occupied by the padding portions 2111 in the frame glue 410 are too large and may block an irradiation of light on the frame glue 410 and hinder a transmission of the signal of the liquid crystal antenna 10. Therefore, in the embodiment, S1 is selected to be equal to 0.6*S2, to consider various performances.

It can be understood that, in other optional embodiments, S1/S2 is equal to 0.75, and a stability of the support and a thickness uniformity of the liquid crystal 300 are enhanced by increasing an area ratio of the padding portions 2111.

It can also be understood that, in other optional embodiments, S1/S2 is equal to 0.5, and by reducing an area ratio of the padding portions 2111, a light is easy to irradiate the frame rubber 410 and to facilitate a signal transmission of the liquid crystal antenna 10. The padding portions 2111 at least occupy half of the frame glue area to ensure a support stability.

Optionally, in one embodiment, lengths of part of the padding portions 2111 along the second direction are equal to a width of the frame glue 410 along the second direction, so that a metal material of the padding portions 2111 can be wrapped and protected by the frame glue 410. On a side close to the liquid crystal 300, the spacers 211 are prevented from contacting a material of the liquid crystal 300, which affects a state control of the liquid crystal 300 material by the functional parts 212. A side away from the liquid crystal 300 is also prevented from contacting the padding portions 2111 with water and oxygen in the air, which may cause corrosion of the metal material of the padding portions 2111. At a same time, the frame glue 410 can be prevented from being too wide in the second direction, to realize an overall narrow frame of the liquid crystal antenna 10.

Figure 9:
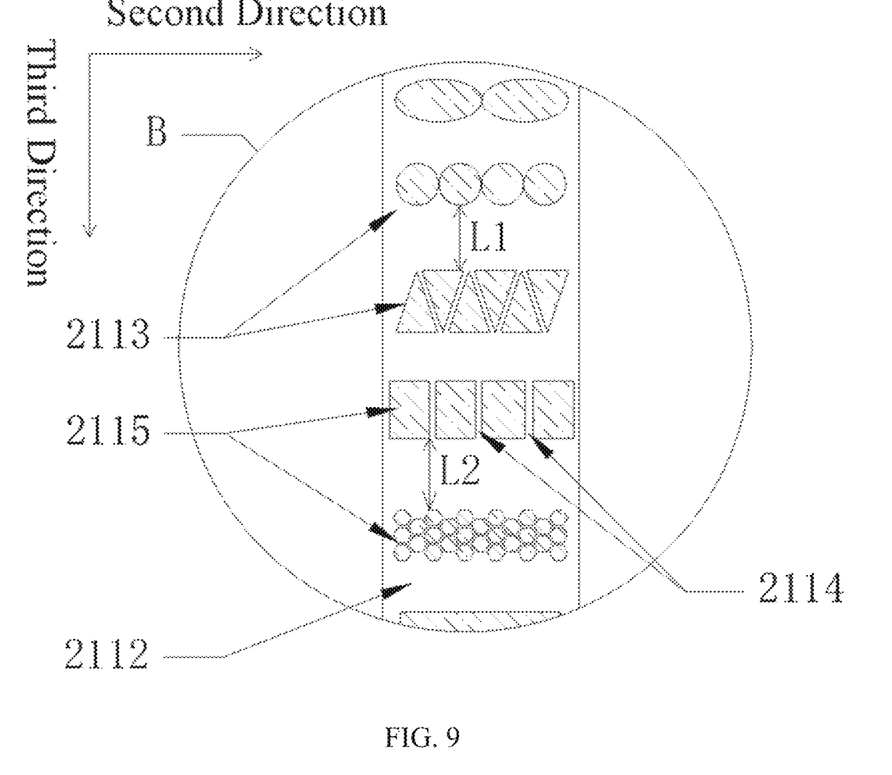
FIG. 9 illustrates a partial enlarged view of an area B in in FIG. 7.

FIG. 9 illustrates a partial enlarged view of an area B in in FIG. 7. It can be understood that, in one embodiment, lengths of the part of the padding portion 2111 along the second direction may also be smaller than the width of the frame glue 410 along the second direction, and part of the frame glue 410 is arranged on or two sides of the padding portions 2111 along the second direction, so that the frame glue 410 can better wrap the padding portions 2111.

Optionally, in one embodiment, at least part of the padding portions 2111 includes a plurality of first padding sub-portions 2113 arranged along the second direction, and second intervals 2114 is arranged between the first padding sub-portions 2113 in a same padding portion 2111. By setting the second intervals 2114, more paths are provided for light irradiation, and at the same time, the distribution of the irradiation paths is more uniform than only the first intervals 2112, which can better illuminate the frame glue 410, realize a curing of the frame glue 410, and improve support and seal stability.

In the embodiment, projections of part of the padding sub-portions on the second substrate 200 along the first direction are rectangular, to facilitate design and processing.

Optionally, in one embodiment, projections of some of the padding sub-portions on the second substrate 200 along the first direction may also be circular or elliptical, and a light transmission performance can be improved through a relatively loose arrangement.

It can be understood that projections of part of the padding sub-portions on the second substrate 200 along the first direction can also be in a shape of a triangle or a hexagon, and edges of the padding sub-portions are parallel and close to each other, and a support performance is improved through a relatively tight arrangement.

It can also be understood that the padding sub-portions can be a combination of various forms, to adjust shapes and specifications of the first interval 2112 and the second interval 2114 as needed and obtain an optimal balance point between a supporting performance and a light-transmitting performance.

In the embodiment, part of the padding portions 2111 include a second padding sub-portion 2115, and a shape of the first padding sub-portion 2113 is different from a shape of the second padding sub-portion 2115. A sum of the areas of the first padding sub-portions 2113 in any padding portion 2111 is M1, a sum of areas of the second padding sub-portions 2115 in any padding portion 2111 is M2, and M1 is equal to M2. By setting the first padding sub-portions 2113 and the second padding sub-portions 2115 with different shapes in the padding portion 2111 while keeping their areas consistent, sizes and shapes of the first interval 2112 and the second interval 2114 can be adjusted while keeping light transmission areas unchanged, to change a support performance of the support structure 400 and a light transmission performance.

Optionally, a distance between adjacent first padding sub-portions 2113 in the third direction is L1, and a distance between adjacent second padding sub-portions 2115 in the third direction is L2, and L2≥L1. At a same time, a distance between the second padding sub-portions 2115 along the second direction is smaller than a distance between the first padding sub-portions 2113 along the second direction. A support effect is improved by providing the second padding sub-portions 2115 closely arranged in the second direction.

It should be noted that, in the embodiment, the second padding sub-portions 2115 are arranged to overlap the functional parts 212 in the second direction, and the first padding sub-portions 2113 are arranged overlapping intervals between the functional parts 212 in the second direction. Since a radiation signal mainly propagates outward along the second direction from the functional parts 212 and the radiation electrodes 120, a loosely arranged second padding sub-portions 2115 in the third direction are more likely to allow a radiation signal to pass through, thereby improving a signal transmission effect. Since corresponding functional parts 212 or radiation electrodes 120 are arranged at intervals along the third direction, through which less signals propagate, the first padding sub-portions 2113 that are densely arranged in the third direction have less influence on overall signals. As a whole, through a design of sub-portions with different arrangement densities along the third direction, both a support effect and a signal transmission effect are taken into account.

It should be noted that, in the embodiment, part of the padding sub-portions is referred to as the second padding sub-portions 2115 to describe that sums of areas of the padding sub-portions in different padding portions 2111 are consistent. However, when other features of the padding sub-portion are described, any second padding sub-portion 2115 has all features of the first padding sub-portion 2113.

Figure 10:
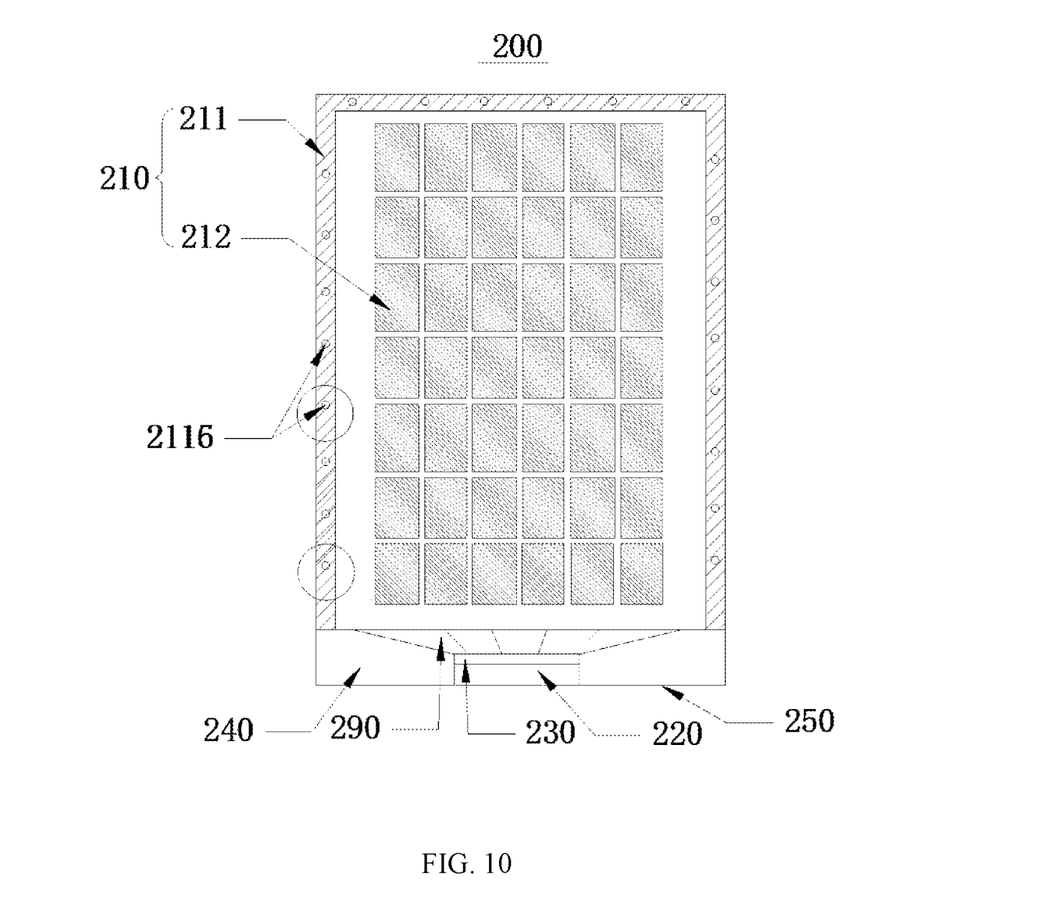
FIG. 10 illustrates a schematic diagram of a second substrate provided by another embodiment of the present disclosure.

FIG. 10 illustrates a schematic diagram of the second substrate 200 provided by another embodiment of the present disclosure. Part of the spacers 211 are arranged with light-transmitting portions 2116 that penetrate the spacers 211 along the first direction, and part of the spacers 211 that are not arranged with light-transmitting portions 2116 are connected to each other as a whole, so that ultraviolet light can be transmitted through the light-transmitting portions 2116, the frame glue 410 can be cured, and integrated spacers 211 can provide better supporting stability at a same time.

Optionally, in the embodiment, the second substrate 200 may further include ground wires, and the spacers 211 are connected to the ground wires to discharge static electricity through the ground wires and reduce a risk of static electricity in a panel.

Referring to FIG. 1, FIG. 2, FIG. 7 and FIG. 10, FIG. 11 illustrates a schematic diagram of a liquid crystal antenna 202 provided by an embodiment of the present disclosure. In one embodiment, a splicing liquid crystal antenna 202 (e.g., used as the large antenna 20 in one example) includes four liquid crystal antennas 10, and the second substrate 200 includes a first side 250, a second side 260, a third side 270 and a fourth side 280 connected in sequence. The stepped area 240 is arranged on the first side 250, and the spacers 211 are arranged on the second side 260, the third side 270 or the fourth side 280. Adjacent liquid crystal antennas 10 are spliced through the second side 260, the third side 270 or the fourth side 280. Through the spacers 211 arranged on the second side 260, the third side 270 or the fourth side 280, a signal of the liquid crystal antenna 10 can propagate through the first intervals between the spacers 211, which facilitates a propagation of the signal, and leave the step area 240 on an outer periphery of the splicing liquid crystal antenna 202 to facilitate assembly and testing at a same time.

Figure 11:
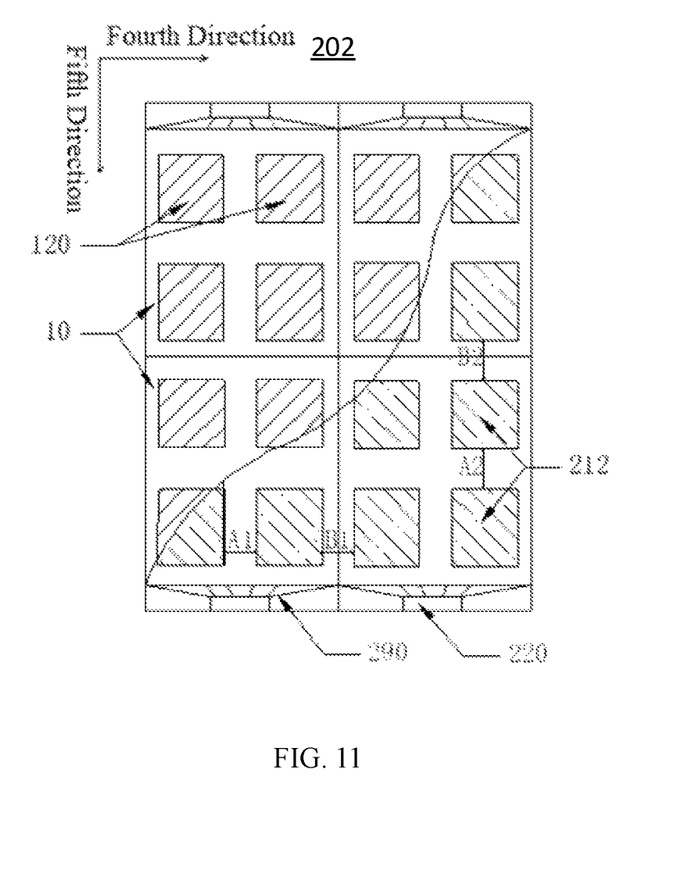
FIG. 11 illustrates a schematic diagram of a splicing liquid crystal antenna provided by an embodiment of the present disclosure.

It should be noted that, in the embodiment, number of functional parts 212 included in any liquid crystal antenna 10 is equal to number of radiation electrodes 120, to obtain a better phase shifting effect. It can be understood that a specific number of functional parts 212 and radiation electrodes 120 can be selected according to actual needs, such as 4, 16, 25, 42, 64, 256 or the like, which is not limited herein.

Optionally, in one embodiment, the functional parts 212 in the liquid crystal antenna 10 are arranged along a fourth direction and a fifth direction, and the fourth direction and the fifth direction are orthogonal. A distance between the functional parts 212 in a same liquid crystal antenna 10 along the fourth direction is A1, and a distance between adjacent functional parts 212 in adjacent liquid crystal antennas 10 along the fourth direction is B1, and B1 is equal to A1. Distances between the functional parts 212 in the splicing liquid crystal antenna 202 in the fourth direction are consistent, to facilitate a better signal regulation.

It can be understood that, in other optional embodiments, 1.2*B1 is equal to A1. By setting a distance between the functional parts 212 in adjacent liquid crystal antennas 10 to be small, a frame distance is reduced, which is more conducive to realizing a seamless splicing of the whole liquid crystal antenna 202.

It can be understood that, in other optional embodiments, A1 is equal to 0.8*B1, and the distance between the functional parts 212 in adjacent liquid crystal antennas 10 is relatively large, which simplifies assembly process and design difficulty.

Optionally, in one embodiment, a distance between the functional parts 212 in a same liquid crystal antenna 10 along the fifth direction is A2, a distance between adjacent functional parts 212 in adjacent liquid crystal antennas 10 along the fifth direction is B2, and B2 is equal to A2. Distances between the functional parts 212 in the splicing liquid crystal antenna 202 in the fifth direction are consistent, to facilitate a better signal regulation.

It can be understood that, in other optional embodiments, 1.2*B2 is equal to A2. By setting the distance between the functional parts 212 in adjacent liquid crystal antennas 10 to be small, a frame distance is reduced, which is more conducive to realizing a seamless splicing of the whole liquid crystal antenna 202.

It can be understood that, in other optional embodiments, A2 is equal to 0.8*B2. By setting the distance between the functional parts 212 in adjacent liquid crystal antennas 10 to be large, assembly process and design difficulty are simplified.

Figure 12:
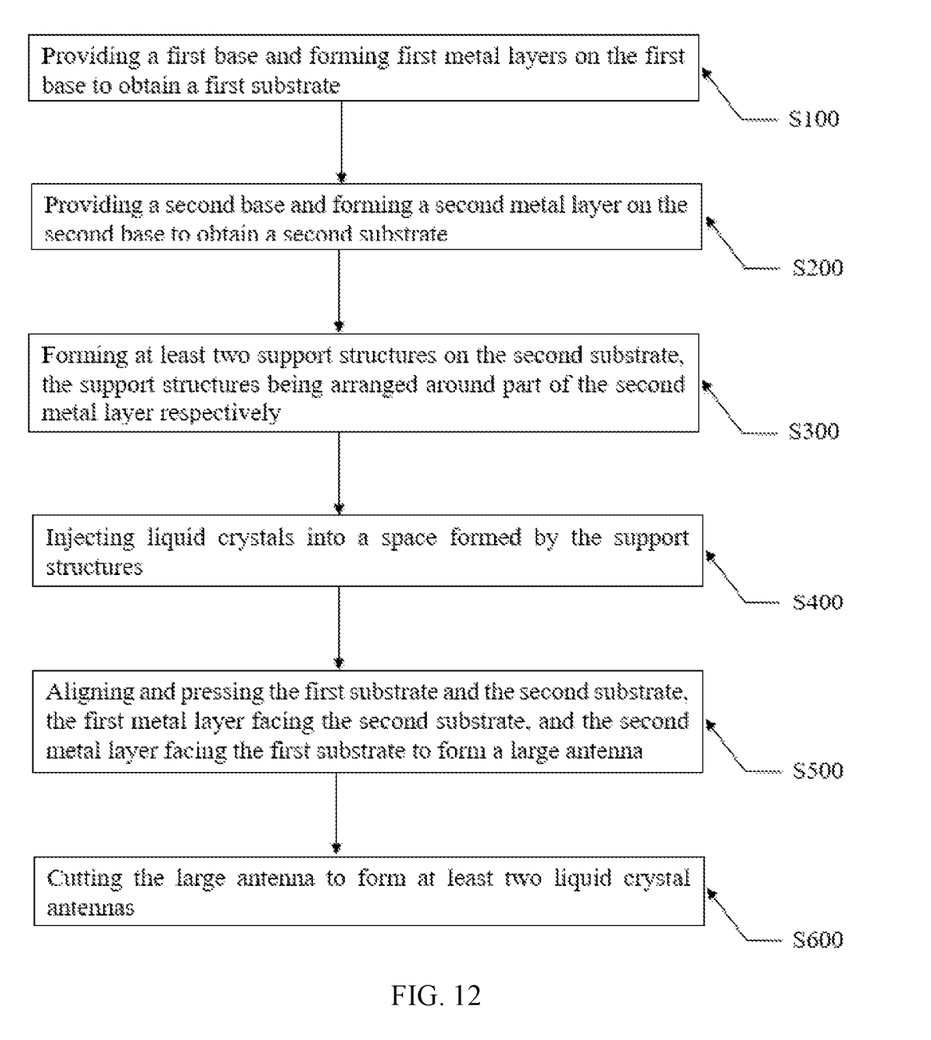
FIG. 12 illustrates a flow chart of a method of forming a liquid crystal antenna provided by an embodiment of the present disclosure.

FIG. 12 illustrates a flow chart of a method of forming the liquid crystal antenna 10 provided by an embodiment of the present disclosure. Referring to FIG. 1, FIG. 2 and FIG. 12, the method includes the following steps.

S100: providing a first base and forming first metal layers 110 on the first base to obtain a first substrate 100.

In the embodiment, the patterned first metal layers 110 are formed by forming complete metal film layers, coating photoresists, and forming the first metal layers 110 by etching after exposure.

It should be noted that after the first metal layers 110 are formed on a side of the first base, radiation electrodes 120 needs to be formed on the other side of the first base to obtain the first substrate 100. By forming the radiation electrodes 120 in advance, the radiation electrodes 120 are avoided to be formed after a subsequent assembly process, which causes a process difficulty.

It can be understood that, in other optional embodiments, the radiation electrodes 120 may not be formed in S100, but the radiation electrodes 120 may be attached in a subsequent process to match different process and performance requirements.

S200: providing a second base and forming a second metal layer 210 on the second base to obtain a second substrate 200.

In the embodiment, the patterned second metal layer 210 is formed by forming a complete metal film layer, coating a photoresist, and the patterned second metal layer 210 by etching after exposure.

S300: forming at least two support structures 400 around part of the second metal layer 210 respectively on the second substrate.

In the embodiment, ring-shaped support structures 400 arranged in an array are formed on the second substrate, and each support structure 400 surrounds part of the second metal layer 210 for accommodating liquid crystals 300 in a subsequent process and supporting the first substrate 100 and the second substrate 200.

It should be noted that, in the embodiment, an alignment layer needs to be formed on the second substrate 200 before forming the support structures 400, to realize an effective control of a subsequent injection of the liquid crystals 300.

S400: injecting the liquid crystals 300 into a space formed by the support structures 400.

Optionally, in the embodiment, before injecting the liquid crystals 300 into the space formed by the support structures 400, it is necessary to irradiate the support structures 400 with ultraviolet light for pre-curing, to better maintain a shape of the support structure 400 and prevent the liquid crystals 300 from leaking out.

An irradiation direction of at least part of ultraviolet light is from a side of the second substrate 200 where the second metal layer 210 is not arranged to a side where the second metal layer 210 is arranged, to better control a curing degree.

S500: aligning and pressing the first substrate 100 and the second substrate 200, the first metal layers 100 facing the second substrate 200, and the second metal layer 200 facing the first substrate 100 to form a large antenna 20.

In the embodiment, after the first substrate 100 and the second substrate 200 are bonded together, the support structures 400 needs to be irradiated by ultraviolet light again to fix shapes of the support structures 400 to support the first substrate 100 and the second substrate 200.

S600: cutting the large antenna 20 to form at least two liquid crystal antennas 10.

Optionally, in the embodiment, the independent liquid crystal antennas 10 can be spliced and used after the liquid crystal antennas 10 are formed.

It can be understood that, in other optional embodiments, the liquid crystal antenna 10 can also be used alone.

As disclosed, the crystal antenna and the splicing crystal antenna and the method of forming the crystal antenna provided by the present disclosure at least achieve the following beneficial effects.

Because the first metal layers, spacers and functional parts are made of metals, when an area of a metal film is large, especially between the liquid crystal antennas that are far away in the large antenna, there will be a large difference in film thickness, while differences in film thickness in adjacent areas are small, so thicknesses of the spacers on a same antenna is basically same, which will not cause fluctuations in a box thickness. Due to small differences in film thickness between the functional parts and the spacers in a same liquid crystal antenna, a distance between the first metal layers on the first substrate of the liquid crystal antenna and the functional parts on the second substrate is approximately a distance between the first metal layers and the spacers. By arranging the spacers on the second substrate and placing the support structures between the spacers and the first metal layers, the distance between the first metal layers on the first substrate of the liquid crystal antenna and the functional parts on the second substrate is controlled by specifications of the support structures. When the support structures with a uniform specification is adopted, the distance between the first metal layers and the spacers is fixed to be equal to the specification of the support structures and is not affected by thicknesses of the spacer and the first metal layers. Furthermore, the distance between the first metal layers and the function parts is fixed to be equal to the specification of the support structures, which can ensure that box thicknesses of a plurality of liquid crystal antennas made from the large antennas are uniform.

Therefore, the liquid crystal antenna in the present disclosure avoids a problem that when only a single metal layer is arranged, the support structures can only control a distance between the first metal layer and the second glass base and is still affected by thicknesses of the functional parts, thereby avoiding an influence of thickness fluctuation in a process on thicknesses of the liquid crystal layers in different liquid crystal antennas. the distance between the functional parts and the first metal layers affects a performance of the liquid crystal antenna because the distance plays a role of phase shifting. By controlling a stability of the distance, a performance of each independent liquid crystal antenna is consistent, which is conducive to using and improves a performance of the liquid crystal antenna.

The above description of the disclosed embodiments is provided to enable a person skilled in the art to make or use the disclosure. Various modifications to the embodiments may be apparent to a person skilled in the art. General principles defined herein may be implemented in other embodiments without departing from the spirit or scope of the present disclosure. Accordingly, the present disclosure will not be limited to the embodiments shown herein but will conform to a widest scope consistent with the principles and novel features disclosed herein.

What is claimed is:

1. A liquid crystal antenna, comprising support structures, liquid crystals, a first substrate and a second substrate, wherein:

the first substrate and the second substrate are arranged oppositely, the support structures are arranged between the first substrate and the second substrate, the first substrate includes first metal layers arranged on a side of the first substrate facing the second substrate, the second substrate includes a second metal layer arranged on a side of the second substrate facing the first substrate;

the second metal layer includes functional parts and spacers, the functional parts and the first metal layers are stacked along a first direction perpendicular to the second substrate, and the functional parts at least partially overlap the first metal layers; and the support structures are arranged between the spacers and the first metal layers.

2. The liquid crystal antenna according to claim 1, wherein a ratio of a thickness of the spacer along the first direction to a thickness of the functional part along the first direction is greater than or equal to 0.8 and less than or equal to 1.2.

3. The liquid crystal antenna according to claim 1, wherein the spacers are disconnected from the functional parts.

4. The liquid crystal antenna according to claim 3, wherein the second substrate includes a central area and a peripheral area arranged around the central area, the functional parts are arranged in the central area, and the spacers are arranged in the peripheral area.

5. The liquid crystal antenna according to claim 4, wherein:

the spacer includes a plurality of padding portions arranged adjacent to at least one edge of the second substrate, at least one first interval is between a plurality of projections formed by the plurality of padding portions toward the one edge along a second direction pointing from the one edge to the central area.

6. The liquid crystal antenna according to claim 5, wherein in the plurality of padding portions arranged along a same edge and adjacent to each other, the plurality of projections formed toward the one edge along the second direction are spaced apart from each other.

7. The liquid crystal antenna according to claim 5, wherein the at least one first interval is rectangular, a length of the at least one first interval along the second direction is greater than a length of the at least one first interval along a third direction perpendicular to the second direction.

8. The liquid crystal antenna according to claim 5, further comprising a frame glue arranged between the first substrate and the second substrate, and at least part of the frame glue being arranged in the first interval.

9. The liquid crystal antenna according to claim 8, wherein a ratio of a projected area of the padding portion on the second substrate along the first direction to a projected area of the frame glue on the second substrate along the first direction is greater than or equal to 0.5 and less than or equal to 0.75.

10. The liquid crystal antenna according to claim 8, wherein a length of the padding portion along the second direction is less than or equal to a width of the frame glue along the second direction, and at least part of the frame glue is arranged on at least one side of the padding portions along the second direction.

11. The liquid crystal antenna according to claim 4, wherein at least part of the padding portions includes a plurality of first padding sub-portions arranged along the second direction, and second intervals are between the first padding sub-portions in a same padding portion.

12. The liquid crystal antenna according to claim 11, wherein:
at least part of the spacing portions includes second padding sub-portions, a shape of the first padding sub-portion is different from a shape of the second padding sub-portion; and
a sum of areas of the first padding sub-portions in any of the padding portions is equal to a sum of areas of the second padding sub-portions in any of the padding portions.

13. The liquid crystal antenna according to claim 12, wherein a distance between adjacent first padding sub-portions in a third direction perpendicular to the second direction is L1, a distance between adjacent second padding sub-portions in the third direction is L2, and L2≥L1.

14. The liquid crystal antenna according to claim 1, wherein:
projections of at least part of the functional parts on the second substrate along the first direction overlaps projections of the first metal layers on the second substrate along the first direction; and
a ratio of a distance from the first metal layers to the functional parts along the first direction to a thickness from the first metal layers to a top of the spacers along the first direction is greater than or equal to 0.8 and less than or equal to 1.2.

15. The liquid crystal antenna according to claim 1, further comprising a signal control component and a signal transmission component, wherein:
the second substrate includes a stepped area, and the signal control component and the signal transmission component are arranged in the stepped area; and
a projection of the first substrate on the second substrate along the first direction covers areas of the second substrate except the stepped area.

16. The liquid crystal antenna according to claim 15, wherein:
the first substrate includes a radiation arranged on a side of the first substrate away from the second substrate; and
a signal control component is electrically connected to the functional parts and is electrically connected to the first metal layers.

17. The liquid crystal antenna according to claim 15, wherein the second substrate includes a first side, a second side, a third side and a fourth side that are connected in sequence, the stepped area is arranged on the first side, and the spacers are arranged on the second side, the third side and the fourth side.

18. The liquid crystal antenna according to claim 1, wherein part of the spacers are arranged with light-transmitting portions penetrating through the spacers along the first direction, and part of the spacers not arranged with light-transmitting portions are connected to each other as a whole.

19. The liquid crystal antenna according to claim 1, further comprising a signal control component and a signal transmission component, wherein:
the second substrate includes a stepped area, and the signal control component and the signal transmission component are arranged in the stepped area;
a projection of the first substrate on the second substrate along the first direction covers areas of the second substrate except the stepped area; and
two ends of the fan-out line are respectively connected to the functional part and the signal transmission component.

20. The liquid crystal antenna according to claim 1, wherein a ratio of a thickness of the fan-out line along the first direction to a thickness of the spacer along the first direction is greater than or equal to 0.8 and less than or equal to 1.2.

21. A splicing liquid crystal antenna comprising liquid crystal antennas, a liquid crystal antenna of the liquid crystal antennas comprising support structures, liquid crystals, a first substrate and a second substrate, wherein:
the first substrate and the second substrate are arranged oppositely, the support structures are arranged between the first substrate and the second substrate, the first substrate includes first metal layers arranged on a side of the first substrate facing the second substrate, the second substrate includes a second metal layer arranged on a side of the second substrate facing the first substrate;
the second metal layer includes functional parts and spacers, the functional parts and the first metal layers are stacked along a first direction perpendicular to the second substrate, and the functional parts at least partially overlap the first metal layers;
the support structures are arranged between the spacers and the first metal layers;
the functional parts in the liquid crystal antenna are arranged along a second direction and a third direction, and the second direction and the third direction are orthogonal;
a distance between the functional parts in a same liquid crystal antenna along the second direction is A1, a distance along the second direction between adjacent functional parts of the adjacent liquid crystal antennas along the fourth direction is B1, and 1.2*B1≥A1≥0.8*B1; and
a distance between the functional parts in a same liquid crystal antenna along the third direction is A2, a distance along the third direction between adjacent functional parts of the adjacent liquid crystal antennas along the fifth direction is B2, and 1.2*B2≥A2≥0.8*B2.

22. The splicing liquid crystal antenna according to claim 21, wherein:
the second substrate includes a first side, a second side, a third side and a fourth side connected in sequence, a stepped area is arranged on the first side, and the spacers are arranged on the second side, the third side or the fourth side; and
adjacent liquid crystal antennas are spliced through the second side, the third side or the fourth side.

23. A method of forming a liquid crystal antenna comprising support structures, liquid crystals, a first substrate and a second substrate, wherein:
the first substrate and the second substrate are arranged oppositely, the support structures are arranged between the first substrate and the second substrate, the first substrate includes first metal layers arranged on a side of the first substrate facing the second substrate, the second substrate includes a second metal layer arranged on a side of the second substrate facing the first substrate;
the second metal layer includes functional parts and spacers, the functional parts and the first metal layers are stacked along a first direction perpendicular to the second substrate, and the functional parts at least partially overlap the first metal layers;
the support structures are arranged between the spacers and the first metal layers; and the method includes:
provides a first base and forming first metal layers on the first base to obtain a first substrate;
providing a second base and forming a second metal layer on the second base to obtain a second substrate;
forming at least two support structures on the second substrate, the support structures being arranged around part of the second metal layer respectively;
injecting liquid crystals into a space formed by the support structures;
aligning and pressing the first substrate and the second substrate, the first metal layer facing the second substrate, and the second metal layer facing the first substrate to form a large antenna; and
cutting the large antenna to form at least two liquid crystal antennas.

\* \* \* \* \*